United States Patent
Fite, IV et al.

(10) Patent No.: US 7,637,417 B2
(45) Date of Patent: Dec. 29, 2009

(54) FOLDABLE UTENSIL SET

(76) Inventors: Francis Bartow Fite, IV, 730 39th Ave., Seattle, WA (US) 98122; Ng Hon Ming, Rm. 1102, Tung Moon House, Tai Hang Estates, Kowloon (CN); Tang Lai Ho, Rm. 902, 9/F, Lei Yan House, Lei On Court, Lam Tin, Kowloon (CN)

( * ) Notice: Subject to any disclaimer, the term of this patent is extended or adjusted under 35 U.S.C. 154(b) by 170 days.

(21) Appl. No.: 11/254,237

(22) Filed: Oct. 19, 2005

(65) Prior Publication Data
US 2007/0084064 A1  Apr. 19, 2007

(51) Int. Cl.
B65D 5/24  (2006.01)
(52) U.S. Cl. .................. 229/186; 229/4.5; 229/189; 229/400
(58) Field of Classification Search ............ 229/4.5, 229/400, 186, 189; 220/62, 62.1
See application file for complete search history.

(56) References Cited

U.S. PATENT DOCUMENTS

| 177,356 | A | * | 5/1876 | Russell ................ 229/106 |
| 198,332 | A | * | 12/1877 | Aulabaugh ............ 229/106 |
| 922,334 | A | | 5/1909 | Regenstein |
| 1,027,719 | A | * | 5/1912 | Fordon et al. .......... 229/189 |
| 1,150,105 | A | | 8/1915 | Emmons |
| 1,438,698 | A | * | 12/1922 | Debs ................... 72/378 |
| 1,613,133 | A | | 1/1927 | Rosener |
| 2,050,894 | A | * | 8/1936 | Paige ................ 229/116.1 |
| 2,340,754 | A | | 2/1944 | Inman |
| 2,491,002 | A | * | 12/1949 | Domecki ............... 220/560 |
| 2,637,136 | A | | 5/1953 | Mark |
| 2,792,981 | A | | 5/1957 | Grammer |
| 2,831,624 | A | | 4/1958 | Lever |
| 2,992,765 | A | | 7/1961 | Kram |
| 3,019,957 | A | * | 2/1962 | Palmer ................. 229/122 |
| 3,097,782 | A | | 7/1963 | Koropatkin et al. |
| 3,119,494 | A | | 1/1964 | Rosenstiel |
| 3,150,812 | A | | 9/1964 | Sabol |
| 3,557,856 | A | | 1/1971 | Berman |
| 3,733,023 | A | * | 5/1973 | Arneson ................ 229/106 |
| 3,767,108 | A | * | 10/1973 | Arneson ................ 229/106 |
| 3,964,668 | A | | 6/1976 | Lin |
| 4,199,097 | A | * | 4/1980 | Christensson ........... 229/106 |

(Continued)

FOREIGN PATENT DOCUMENTS

DE  298 11 914 U1  11/1998
WO  WO 03/074374 A1  9/2003

*Primary Examiner*—Gary E Elkins
(74) *Attorney, Agent, or Firm*—John R. Benefiel (57) ABSTRACT

A foldable utensil set including a bowl, dish, cup and spoon each foldable from a prescored plastic sheet which is semi-transparent to allow angled folds at the corner to be visible as an aesthetic feature. The rims of the bowl and cup have portions at two different levels to prevent liquid from reaching the level of the mating snaps used to secure the bowl and cup in the folded condition. The spoon is folded from a flat sheet having two contiguous sections scored so as to form a handle and bowl portion when folded. The dish has side edges stiffened with a fold over section which also holds the folds in position. Oval shaped scoring is provided as an aesthetic feature and to aid in forming corners on the utensils when being folded.

5 Claims, 8 Drawing Sheets

U.S. PATENT DOCUMENTS

| | | | |
|---|---|---|---|
| 4,313,556 A * | 2/1982 | Boyle et al. ............... 229/116.1 |
| 4,471,901 A * | 9/1984 | Stahlecker ................. 229/171 |
| 4,500,129 A | 2/1985 | Hahn |
| 4,711,390 A | 12/1987 | Andrews et al. |
| 5,016,813 A | 5/1991 | Simons |
| 5,460,324 A | 10/1995 | Vinther |
| 6,019,244 A | 2/2000 | Jones |
| D460,355 S * | 7/2002 | Lenz et al. ................... D9/431 |
| 6,502,744 B1 | 1/2003 | Lorusso |
| 6,523,989 B2 | 2/2003 | Carty |
| 6,752,263 B2 | 6/2004 | Dubsky |
| 7,007,838 B1 | 3/2006 | Bostick, II |
| D524,154 S | 7/2006 | Post |
| 2005/0103834 A1 | 5/2005 | Cousins |
| 2006/0208052 A1 | 9/2006 | Cousins |

\* cited by examiner

FOLDABLE UTENSIL SET

BACKGROUND OF THE INVENTION

This invention concerns food service utensils such as bowls, cups, and dishes which are foldable from flat sheets. Such utensils have been developed and provide the advantage of easy storability. See, for example, U.S. Publication No. 2005/0103834 A1 which describes a handled cup folded from a plastic sheet cut and scored in a particular pattern. Additional similar vessels are currently sold under the ORIKASO™ trademark. While such foldable vessels have been provided, it is not believed that implements such as serving spoons have heretofore been proposed.

It is the object of the present invention to provide foldable food service utensils which are of improved utility and appearance, and are easier to fold up, and have other advantages over foldable utensils heretofore provided.

It is a further object of the present invention to also provide other foldable utensils such as spoons and other implements.

SUMMARY OF THE INVENTION

The above objects and other objects which will be appreciated upon a reading of the following specification and claims are achieved by providing foldable spoons and other such implements formed from a folded sheet cut in a pattern having a generally rectangular handle section made up of several pleat folds flattened together and a contiguously connected bowl section foldable into a spoon bowl.

Two longitudinal fold lines extend along the handle section and into the bowl section where they blend into curved score lines, with a third intermediate longitudinal score line terminating at the handle section.

These three folds form accordion or pleated folds which can be flattened together to form an elongated handle comprised of three layers of plastic sheeting. The bowl section is defined by two upturned sides formed by score lines extending from the handle section, the two sides having curved shapes intersecting the handle section. Sets of triangular fold lines create a down sloping surface at the rear of the spoon bowl.

An auxiliary handle wrap section is folded around the flattened together layers of the handle section and held in place with snaps to hold the layers together, the wrap also acting to stiffen the handle.

Foldable vessels such as bowls, dishes, cups, or the like are also provided formed from semitransparent tinted sheets of plastic such as polypropylene which are cut and scored in particular patterns. The tinted semitransparent plastic sheets allow folded edges at corners of the vessels to be visible through other folded over portions of the sheeting to create an enhanced aesthetic appearance by creating interesting visual features at the corners of the vessel.

The bowl and cup vessels incorporate mating snaps to hold the same in their folded state. One or more parts of the rim of the formed vessel are lower than one or more other parts of the vessel rim to prevent the liquid level in the vessel from reaching the level of the mating snaps which are located adjacent rim parts at a higher level.

Pointed end oval patterns are created at folded corners by score lines which reduce the severity of the bending required to form corners and also provide an attractive visual feature to improve the overall appearance of the vessel.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, and particularly FIGS. 1-7, a foldable serving spoon 10 is shown, including a handle 12 at one end and spoon bowl 14 at the other.

Figures 1, 1A:
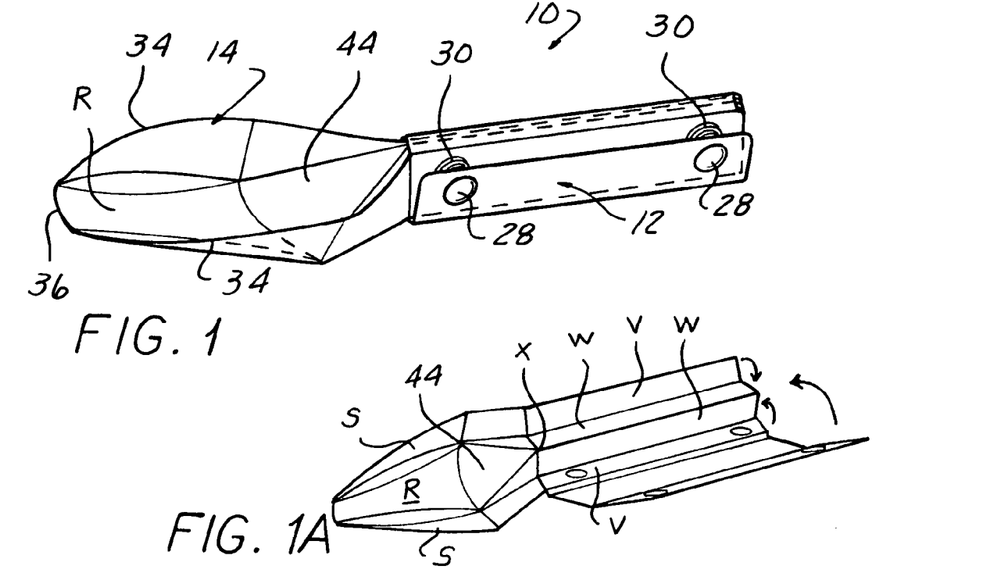
FIG. 1 is a pictorial view of a foldable serving spoon according to the present invention.
FIG. 1A is a pictorial view of a partially folded serving spoon shown in FIG. 1.
Figure 2:
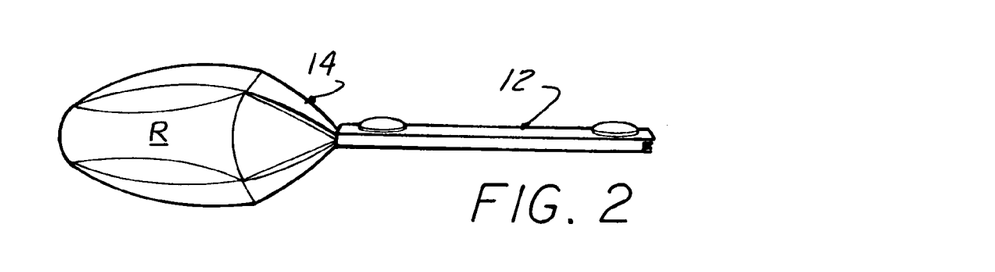
FIG. 2 is a bottom view of the serving spoon shown in FIG. 1.
Figure 3:
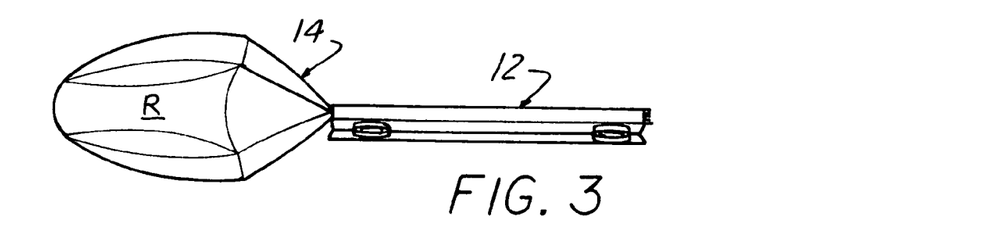
FIG. 3 is top view of the serving spoon shown in FIGS. 1 and 2.
Figure 4:
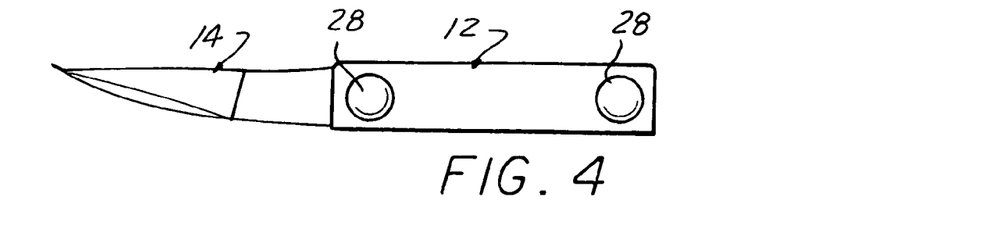
FIG. 4 is a right side view of the serving spoon shown in FIGS. 1-3, the left side view being a mirror image.
Figures 5, 6, 7:
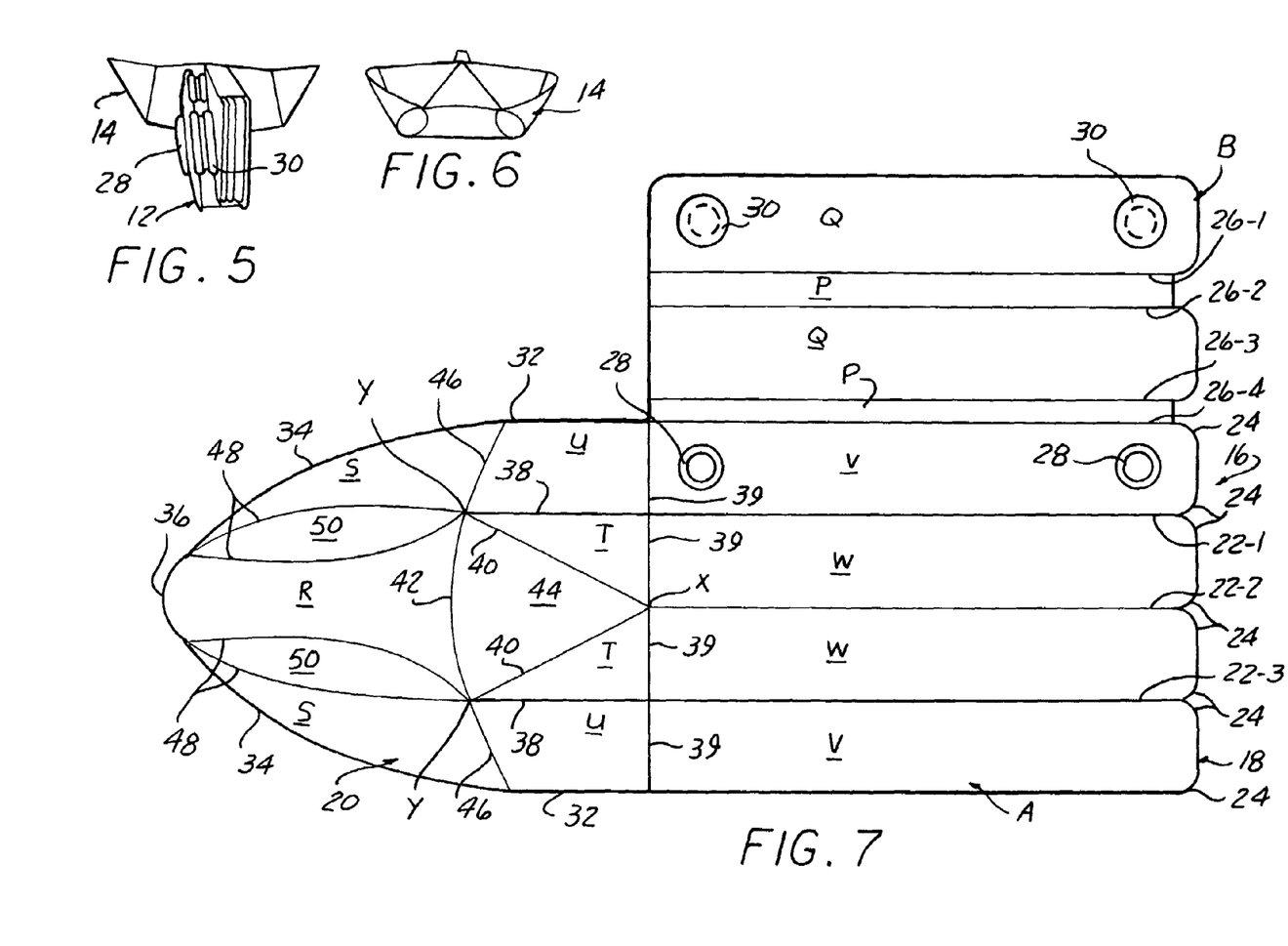
FIG. 5 is a rear end view of the serving spoon shown in FIGS. 1-4.
FIG. 6 is a front end view of the serving spoon shown in FIGS. 1-5.
FIG. 7 is a plan view of a flat sheet cut and scored in a pattern to enable it to be folded into the serving spoon shown in FIGS. 1-6.

The spoon 10 is formed from a flat sheet 16 which is cut and scored in the pattern shown in FIG. 7 enabling it to be folded into the spoon 10.

The sheet 16 is of a suitable plastic such as a food contact grade of polypropylene 0.6 mm thick which has been die cut and scored in the pattern shown in FIG. 7 so as to create a series of fold lines arranged to enable the sheet 16 to be readily foldable into the spoon 10 shown in FIGS. 1-6. The scoring is preferably done with a heated die edge at the time that the sheet is being die cut in a manner known in the art.

The cut pattern produces a generally rectangular section 18 and an integral section 20 having a rounded end projecting from one side of the bottom part A of the section 18.

The scoring pattern includes a first series of equally spaced parallel fold lines 22 extending from side-to-side across the lower part of the first section 18. Rounded corners 24 may be provided at the right side of the rectangles formed by the lines 22.

The upper part B of the section 18 is also scored with a series of lengthwise parallel fold lines 26, two of the lines 26-1, 26-2 relatively closely spaced and two others 26-3, 26-4 even more closely spaced.

Two male snaps 28 are affixed at either end of the lower part A and two female snaps 30 are mounted at either end of the upper part B for a purpose described below.

The projecting section 20 has opposite straight sides 32 at a part contiguous to the first section 18 which extend to curved sides 34 converging together at a rounded tip 36.

The rounded end section 20 has a pattern of score lines including a pair of straight lines 38 extending in alignment from two outboard score lines 22-1 and 22-3 of the section 18 for a portion of the length of section 20.

A pair of second fold lines 40 diverge from a point X at the left end of the centered fold line 22-2 of the section 18 to a point Y intersecting one of the straight lines 38. A slight curved line 42 connects the points Y forming a centered triangle 44 with a curved base.

A pair of straight lines 46 angle out from each point Y to intersect straight side 32 at a backward slanting angle.

Also emanating towards the rounded point 36 from each point Y are respective curved pairs of fold lines 48 forming narrow pointed end ovals 50.

To form the spoon 10, theسheet 16 is first inverted from the position shown in FIG. 7.

The lines 21-1, 2-3 are pleated accordion style to raise the center fold line 22-2 and fold down the adjacent areas W, bringing up the two side areas V as seen in FIG. 7A. This creates a central ridge with the point X elevated. A cross score line 39 extending across all of the areas W and V allows the areas U and T to be angled out from the areas V and W when those areas are flattened together to form the handle 12. This creates the outwardly flaring rear part of the bowl section 14, the triangle 44 sloping down the middle of the bowl section. The folding of these areas causes the triangle 44 to slope down and the side areas U brought up to be alongside the areas T adjacent the triangle 44.

The areas V and W are flattened together to create a bar like handle 12 capable of resisting bending if spoon bowl 14 is loaded to as to be capable of effectively functioning as a handle.

In order to keep the layers of the handle 12 flattened together, the upper Section B is wrapped around these flattened layers, area "Q" folded over the sides and areas "P" over the thickness of the handle. Snaps 30 and 28 are mated together to maintain the handle layers flattened together.

The side areas S are also brought up to form spoon bowl sides, together with side areas U, sloping down to the rounded tip 36. The two oval areas 50 form an angled transition of these sides adjacent to a bottom area R of the spoon bowl 14.

FIGS. 8-13 show a foldable vessel comprised of a bowl 52. This general type of fold up vessel is known in the carryout Chinese restaurant trade, with flat sheets of treated paperboard pre-creased to facilitate fold-up.

Figure 13:
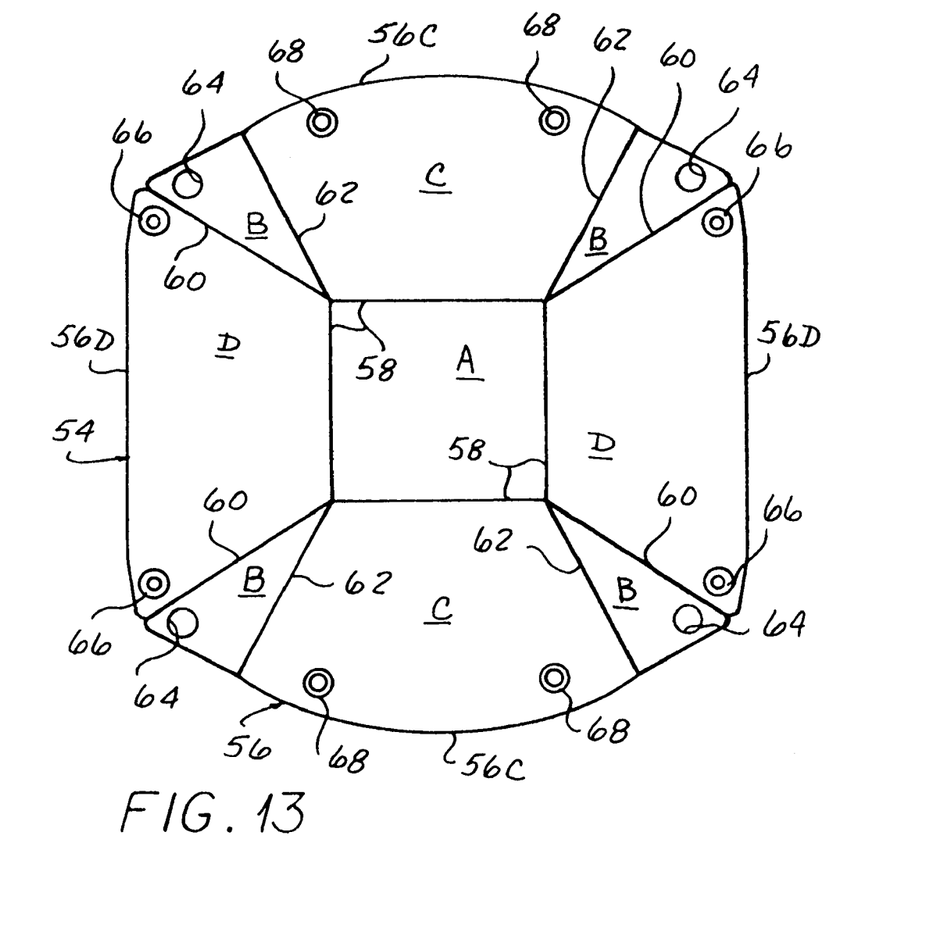
FIG. 13 is a plan view of a flat sheet cut and scored in a pattern enabling it to be foldable into the bowl shown in FIGS. 8-12.

The foldable bowl 50 is formed from a flat sheet 54 of plastic preferably polypropylene of slightly greater thickness than the spoon, i.e. 0.8 mm.

The sheet 34 has a perimeter edge 56 defining a multisided shape, such as the square shown. A series of scored fold lines 58 form a closed shape (i.e., a square, although a triangle and other shapes are also possible) here having sides corresponding to those of the perimeter edge 56, and associated in the same way so that the sides of the square extend in the same general direction as a corresponding side of the perimeter edge 56.

Pairs of diverging fold lines 60, 62 emanate from each corner of the closed shape and extend to the perimeter edge, forming triangular areas B. Two pairs of opposite side areas C and D are thus left between triangular areas B.

A male snap 68 is fixed at each corner of each side area C and a female snap 66 at the corner of each side area D. A clearance hole 64 is punched into the sheet 54 at the top of each triangular area B located so that when the area B is folded along side D onto the outside of the side by folding along lines 60, 62, the male snap 68 can engage a mating female snap 66 through the aligned clearance hole 64.

According to one feature of the present invention the perimeter edge 56C of the sides C forming a part of the bowl rim are curved outwardly while the edges 56D of sides D forming the remainder of the bowl rim are straight across. The snaps 66, 68 are located adjacent the outwardly curved edge.

The edge at the upper corners of the sides D is also slightly curved to be a match to the curve of the edge of the area B.

Figures 8, 8A, 9, 10:
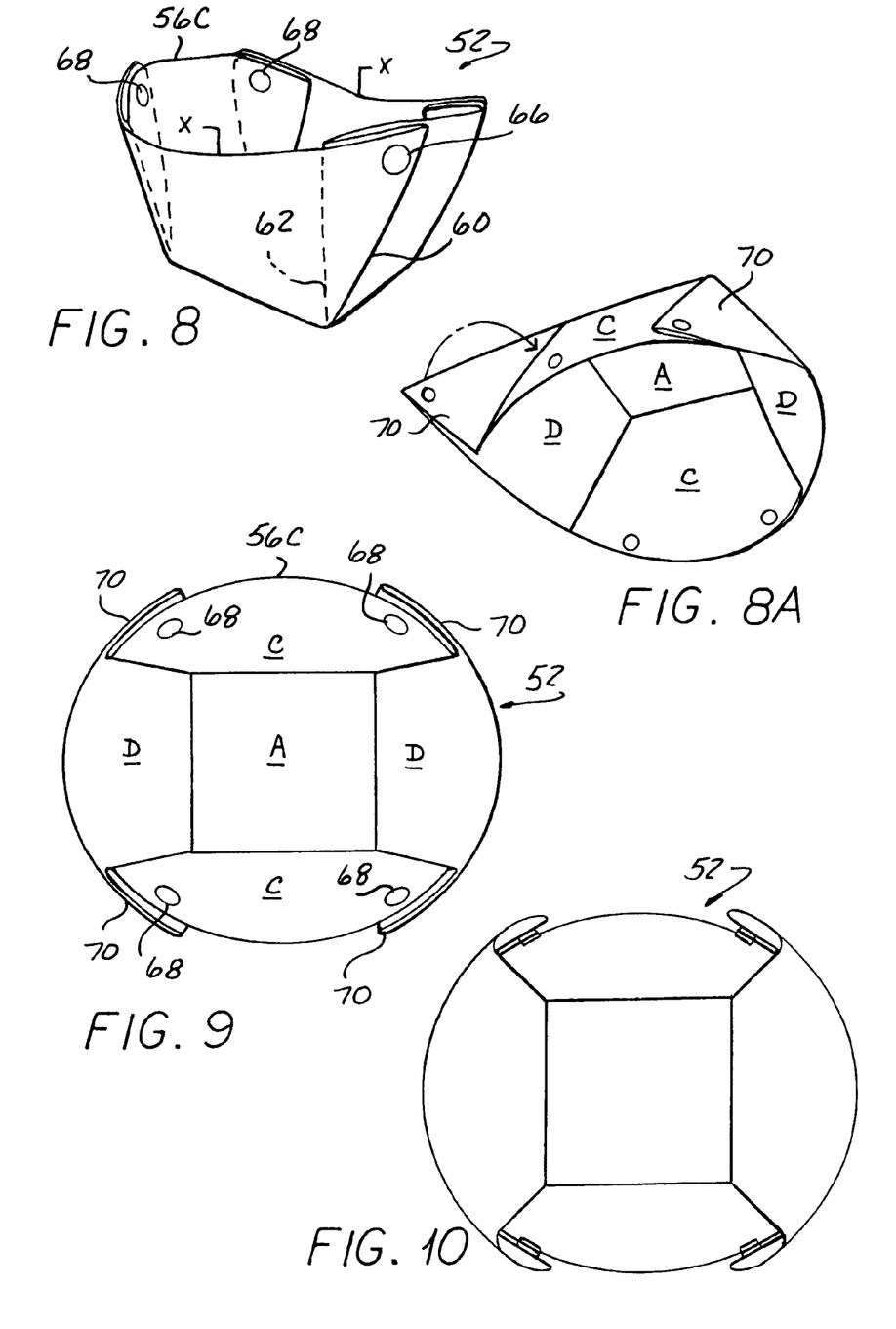
FIG. 8 is a pictorial view of a foldable bowl according to the present invention.
FIG. 8A is a partially inverted and folded view of the foldable bowl shown in FIG. 8.
FIG. 9 is an enlarged top view of the bowl shown in FIG. 8.
FIG. 10 is an enlarged bottom view of the bowl shown in FIGS. 8 and 9.
Figure 11:
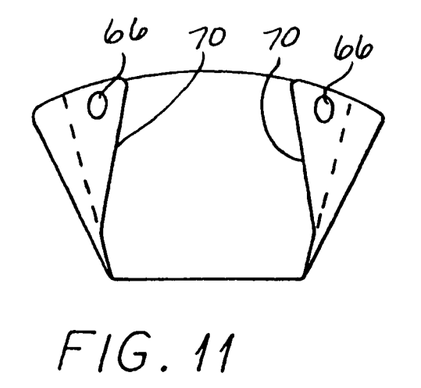
FIG. 11 is a right side view of the bowl shown in FIGS. 8-10, the left side view being identical.
Figure 12:
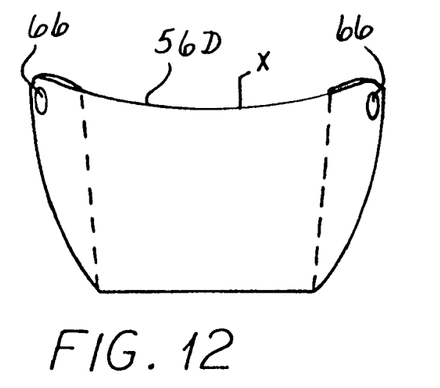
FIG. 12 is a front view of the bowl shown in FIGS. 8-11, the rear view being identical.

When the sides C and D are folded up, a triangular pleat is formed by areas B and the overlying area of the sides D, the pleat 70 overlying the sides C, allowing the snaps 66, 68 to be mated.

In this position, the curved edges 56C form a higher rim part than the lowest point X of straight edges 56D which form a lower dipping curved rim part. This configuration prevents over filling of the bowl 52 to the point where the liquid level would reach that of the mating snaps 66, as well as enhancing the appearance of the bowl 52.

The plastic sheet 54 is semitransparent which adds a distinct aesthetic effect since the inner edge of the pleats 70 defined by the fold line 62 becomes visible through overlying portions of the sheet, combining with the outer edge defined by the fold line 60, which becomes visible from the inside. Thus, an attractive design feature is created to make the appearance of the folded vessel significantly more pleasing.

Referring to FIGS. 14-19, a foldable cup 74 is shown which has some similarities to the bowl 52 described above. That is, a flat sheet of a plastic 76 has a central closed shape (here, a square) formed by a series of fold lines 78. In order to create walls steeper than the bowl 52 so as to be suitable for a cup, triangular flaps 88 are formed by fold lines 80, 82 at each of the corners with narrower sides C, D than the bowl. Elongated ovals 84 define triangular side extension regions C-1 wrapped over the flaps 88 which create a rounded corner 86 between sides C and D. The ovals 84 reduce the bending stress at the corners as well as presenting a pleasing visual feature.

Figures 14, 14A, 15, 16, 17, 18:
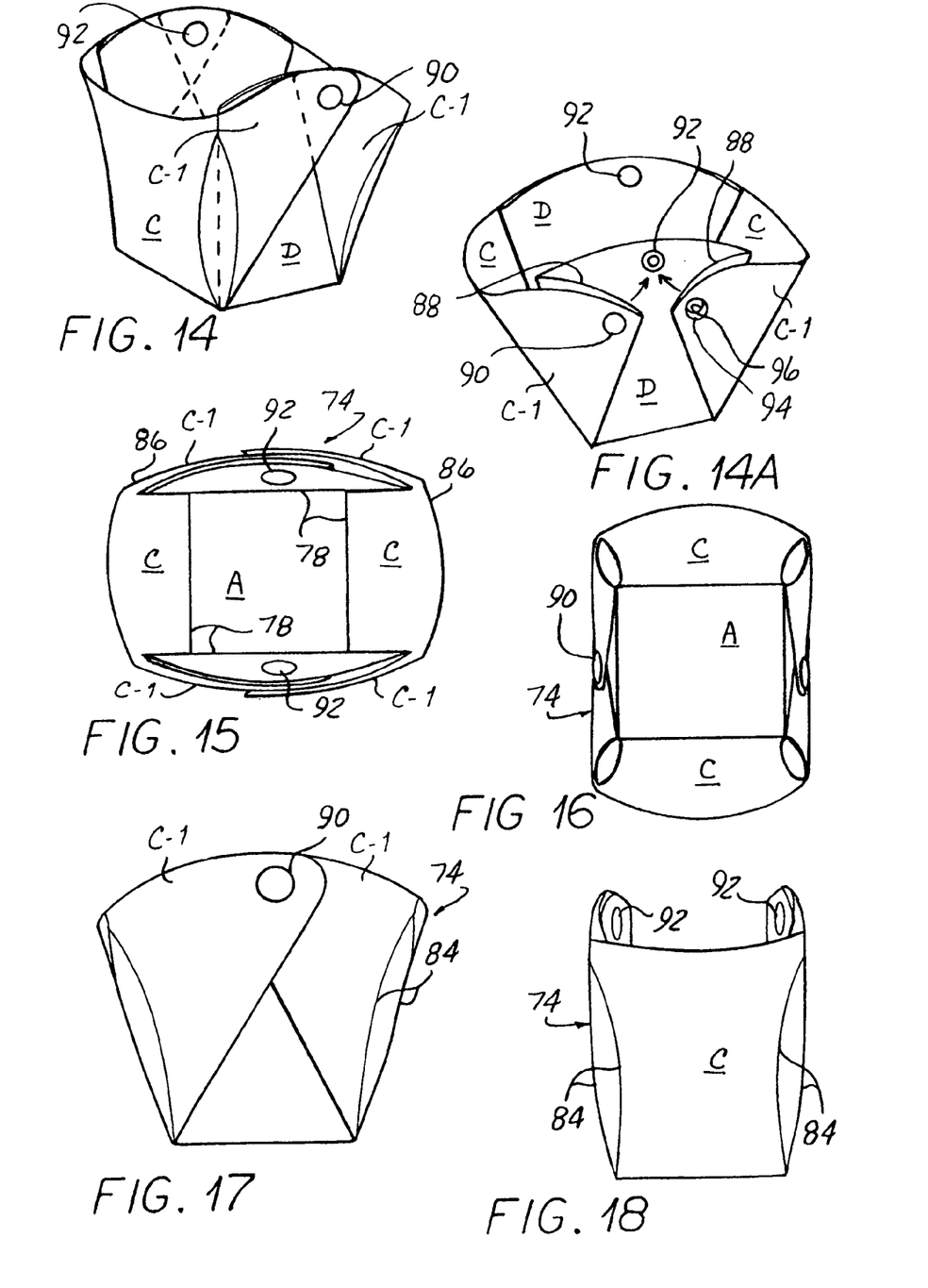
FIG. 14 is a pictorial view of a foldable cup according to the present invention.
FIG. 14A is a pictorial view of the foldable cup shown in FIG. 14, in a partially folded condition.
FIG. 15 is a top view of the cup shown in FIG. 14.
FIG. 16 is a bottom view of the cup shown in FIGS. 14 and 15.
FIG. 17 is a right side view of the bowl shown in FIGS. 14-16, the left side view being identical.
FIG. 18 is a front view of the bowl shown in FIGS. 14-17, the rear view being identical.
Figure 19:
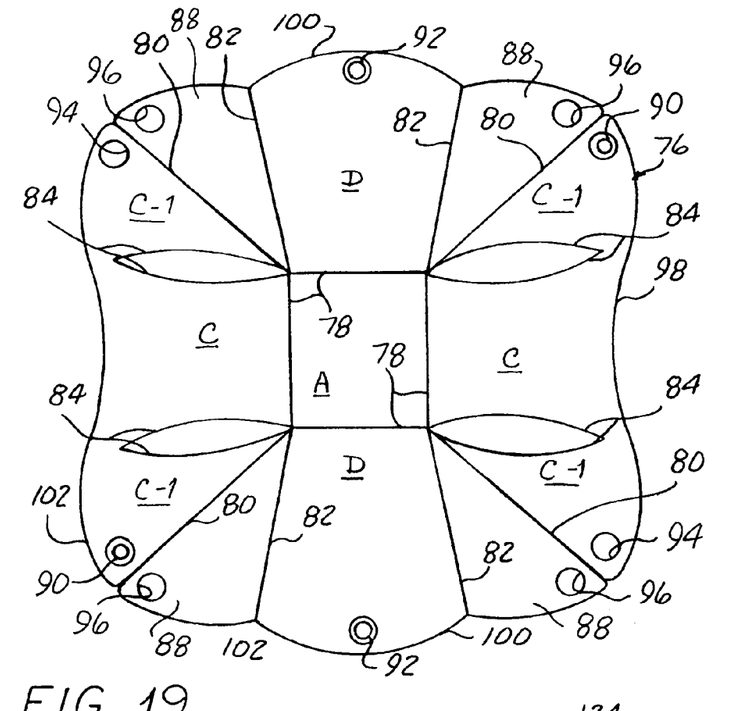
FIG. 19 is a plan view of a sheet cut and scored in a pattern enabling it to be foldable into the cup shown in FIGS. 14-18.

The flaps 88 and side extension regions C-1 are large enough to overlap as seen in FIGS. 14, 17 so that a single set of snaps 90, 92 can hold both flaps 88 and side extension regions C-1 against a side D, passing through two clearance holes 94 in one corner of each of the overlapping flaps 88 and a clearance hole 96 through the end overlapped side extension region C-1.

The top edge 98 of each side C are curved down while the top edges 100 of the sides D and 102 of flaps 88 are curved up to keep the maximum level of liquid below the snaps 90, 92 in similar fashion to the bowl 52.

Referring to FIGS. 20-25, a foldable dish 104 is shown of a rectangular configuration with a pair of low, substantially vertical side walls 106 and end walls 108. The foldable dish 104 is formed by folding a flat plastic sheet 110 of a general rectangular shape, preferably food contact grade polypropylene, 0.8 mm thick as in the bowl and cup described above.

Figure 25:
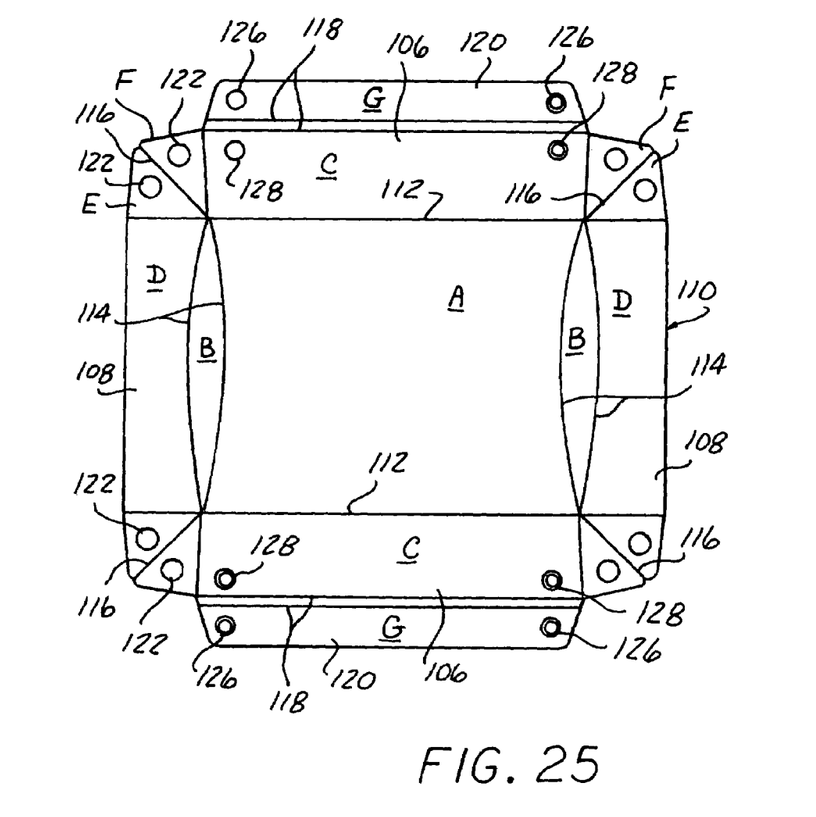
FIG. 25 is a plan view of a sheet cut and scored in a pattern enabling it to be foldable into the dish shown in FIGS. 20-24.

A generally rectangular bottom area "A" is formed by a pair of scored fold lines 112 defining the long side of the dish 104, and two pairs of shallowly curved fold lines 114 forming pointed end oval areas "B". The sides 106 are formed by rectangular areas C outside the fold lines 112 while ends 103 are formed by rectangular areas D outside fold line pairs 114.

A pair of triangular areas E, F are formed by extensions of fold lines 112 and angled fold lines 116 extending out from the corners where the sides 106 and ends 108 abut.

Flap strips 120 are formed by closely spaced double fold lines 118 defining the upper edge of the sides.

Figures 26, 27, 28, 29, 30:
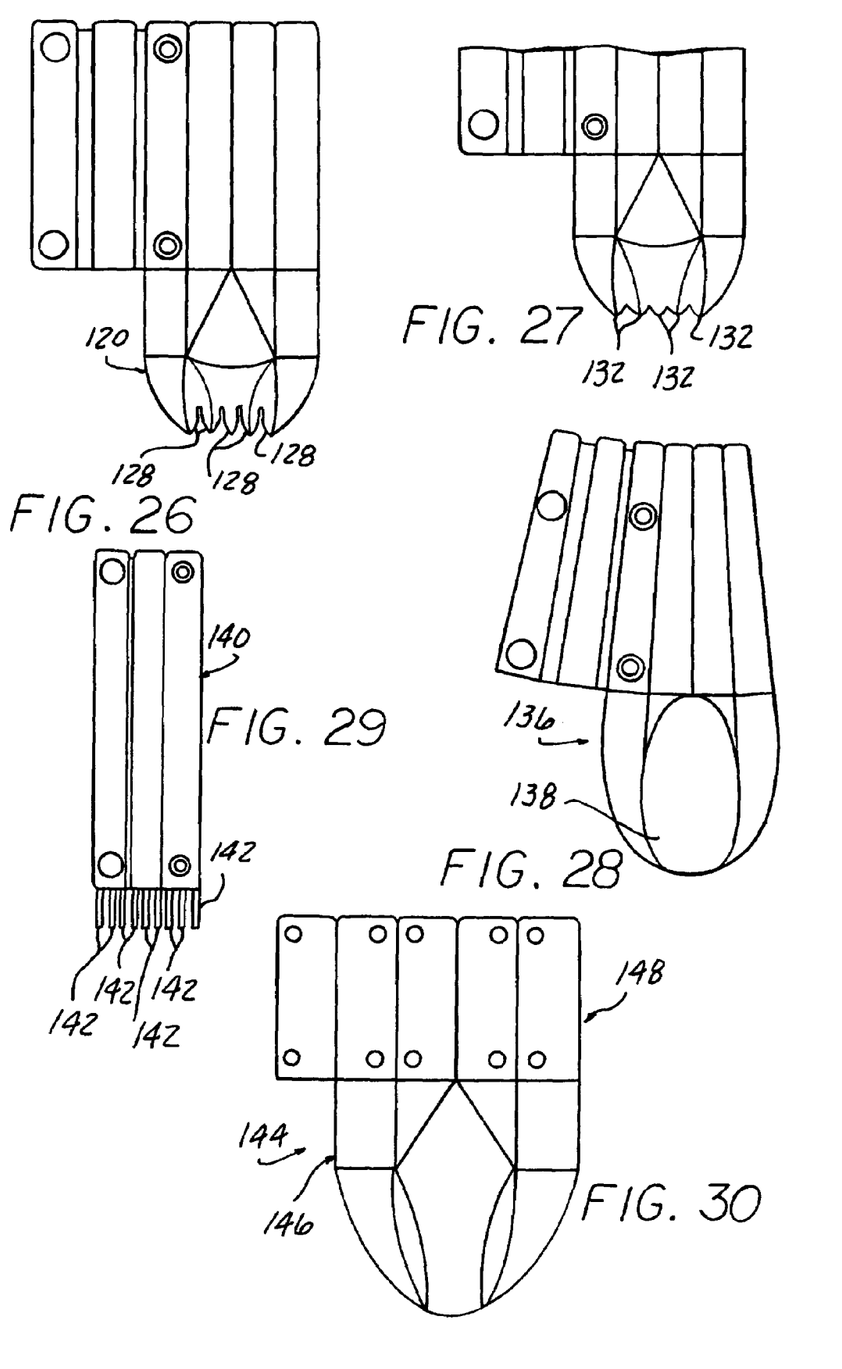
FIG. 26 is a plan view of a sheet cut and scored in a pattern enabling it to be foldable into a fork.
FIG. 27 is a plan view of a sheet cut and scored in a pattern enabling it to be foldable into a combined spoon and fork.
FIG. 28 is a plan view of a sheet cut and scored in a pattern enabling it to be foldable into a dipper or Chinese type spoon.
FIG. 29 is a plan view of a sheet cut and scored in a pattern enabling it to be foldable into a brush.
FIG. 30 is a plan view of a sheet cut and scored in a pattern enabling it to be foldable into a short handled scoop or beach shovel.

Holes 122 are formed in each of the triangular areas E, F which become aligned when the sides 112 and ends 108 are folded up and triangular areas are folded together to project outwardly forming a triangular flap 124. The triangular flaps 124 are wrapped over the outside of the sidewalls 106 (FIGS. 28, 29).

Figures 20, 23, 24:
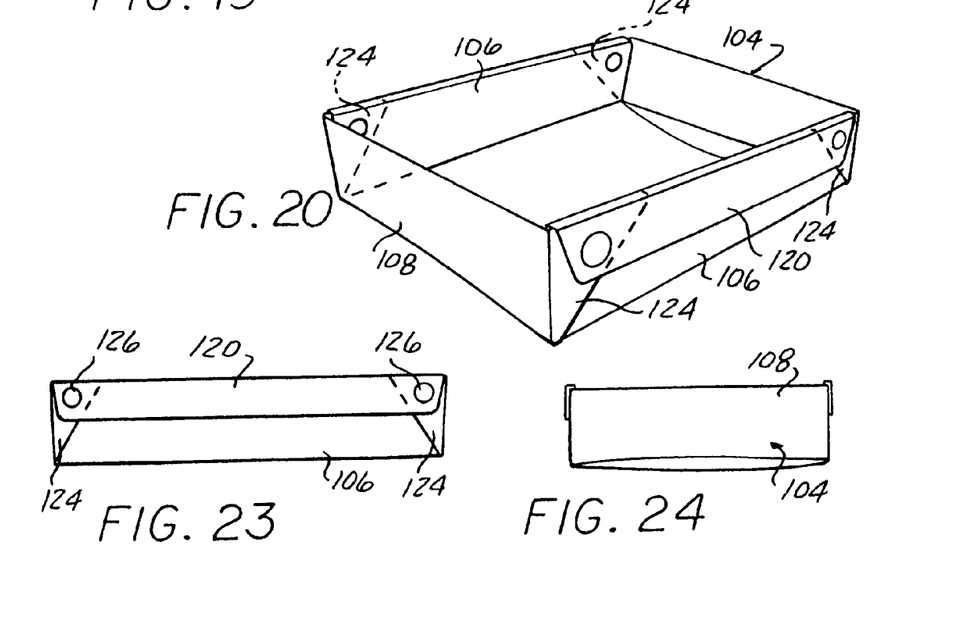
FIG. 20 is a pictorial view of a foldable dish according to the present invention.
FIG. 23 is a right side view of the dish shown in FIGS. 20-22, the left side view being identical.
FIG. 24 is a front view of the dish shown in FIGS. 20-23, the rear view being identical.
Figure 21:
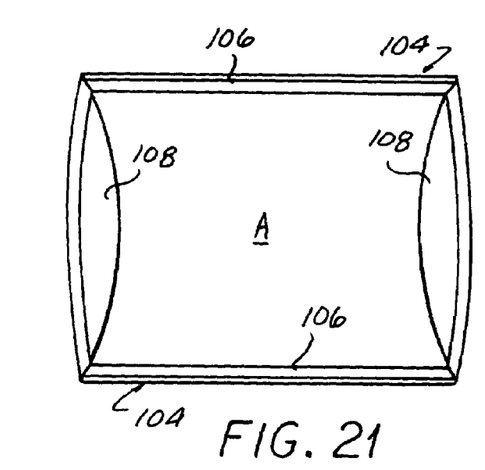
FIG. 21 is a top view of the dish shown in FIG. 20.
Figure 22:
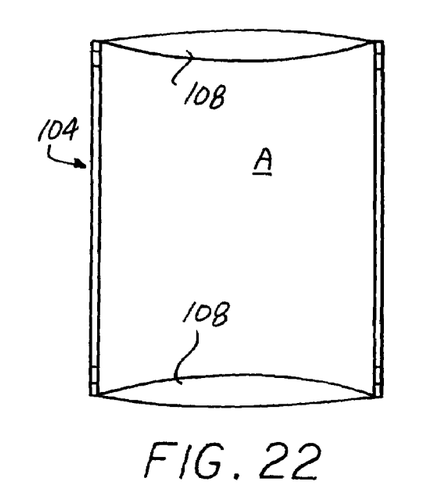
FIG. 22 is a bottom view of the dish shown in FIGS. 20 and 21.

The rectangular flaps 120 are then folded out and over the triangular flaps 124 and the sides 106 (FIGS. 20, 23). Male snaps 126 and now aligned female snaps 128 are snapped together through more aligned holes 122 in the triangular flaps 124 to secure the folded condition of the dish 104.

The rectangular flaps 120 serve to stiffen the longer sides 108.

The semitransparent plastic allows viewing of the triangular flaps 124 through the rectangular flaps 120 and sides 106 as seen in FIG. 20, adding a pleasing visual effect as described above.

It will be appreciated that the various foldable utensils in the set can be varied in size and proportions.

FIGS. 26-30 are variations of the foldable handled utensil described in FIGS. 1-7A.

In FIG. 26, lines 128 are formed on the leading edge of the bowl 130 to provide a foldable fork from a flat sheet.

In FIG. 27, shorter serrations 132 provide a "spork" or combined spoon and fork 134.

In FIG. 28 a Chinese spoon or dipper 136 is provided by eliminating some of the fold lines to create a deeper bowl 138.

FIG. 29 shows a foldable brush 140 formed by providing a series of bristles 142 projecting from a handle section.

FIG. 30 shows a large scoop or beach shovel 144 having a large bowl 146 and a proportionately shorter handle 148.

The invention claimed is:

1. A foldable vessel for holding a liquid comprising a plastic sheet having a plurality of sides defining a perimeter edge of said sheet;
    a series of scored folding lines defining a closed shape at a central region of said plastic sheet having a number of sides corresponding to the sides of the perimeter edge of said plastic sheet and extending in the same general direction as a respective side of said perimeter edge;
    a pair of scored folding lines diverging out from each corner of said closed shape to said perimeter edge to form a series of triangular flaps so that when opposite pairs of vessel sides defined between said triangular flaps are folded up, said triangular flaps can be folded over onto one of said adjacent sides and an extension region of the other adjacent side wrapped over said triangular flap to form a rounded corner;
    further including a mating set of snaps at the top of at least two sets of said side extension regions and adjacent sides in an extension region covered by one of said triangular flaps, with an aligned clearance hole formed in each triangular flap wrapped over by a respective extension region to allow securement of said wrapped condition thereof by mating of said snaps through said clearance hole, the improvement comprising an outwardly curving upper perimeter edge of at least one pair of opposite sides and an inwardly curving perimeter edge on the other pair of opposite sides so that said lower and upper edges define a rim of said folded vessel, the mating snap sets located at a higher level region of said rim when said vessel is folded up to ensure that liquid cannot reach the level at which said mating snap sets are located.

2. A foldable vessel comprising a flat sheet of plastic material formed with a series of fold lines defining a rectangular bottom area with two fold lines radiating out from each corner to form triangular flaps at each corner and two pairs of opposite sides between each two of said triangular flaps, each side extending from a fold line defining said bottom area;
    said triangular flaps formed when each of said sides are bent up about said fold lines forming said center bottom area and wrappable about a respective one of a first pair of said two pairs of opposite sides and with a side extension region of a respective one side of a second pair of opposite sides wrapped over a respective triangular flap;
    a set of mating snaps at the top of at least two sets of sides and said side extension regions securing said flaps wrapped over said first pair of opposite sides;
    and a clearance hole in each triangular flap through which said sets of mating snaps engage each other; and,
    said second pair of opposite sides having rim regions intermediate said side extensions shorter than the height of said mating snaps above said bottom area to form a rim section lower than a rim section whereat said mating snaps and clearance holes are located whereby liquid introduced into said vessel cannot reach the level of said mating snaps and clearance holes.

3. The foldable vessel according to claim 2 wherein adjacent pairs of triangular flaps are wrapped over the same side lying between each of said pairs of flaps.

4. The foldable vessel according to claim 3 wherein each of said pairs of triangular flaps overlap when wrapped over said side and wherein only one of said side extension regions has a snap and the other of said side extension regions is formed with a clearance hole aligned with aligned clearance holes in each of said pair of triangular flaps through which said mating snaps engage each other.

5. The foldable vessel according to claim 3 wherein each of said second pair of opposite side extension regions have a snap mating with a respective one of snap located at the top of each of said first pair of opposite sides.

\* \* \* \* \*